US012615693B2

(12) United States Patent
Hehn

(10) Patent No.: US 12,615,693 B2
(45) Date of Patent: Apr. 28, 2026

(54) EMERGENCY CALL METHOD WITH LOW CONSUMPTION OF SPECTRAL RESOURCES

(71) Applicant: AUDI AG, Ingolstadt (DE)

(72) Inventor: Thorsten Hehn, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 315 days.

(21) Appl. No.: 18/230,780

(22) Filed: Aug. 7, 2023

(65) Prior Publication Data

US 2024/0049353 A1    Feb. 8, 2024

(30) Foreign Application Priority Data

Aug. 8, 2022    (DE) ..................... 10 2022 119 837.5

(51) Int. Cl.
*H04W 76/50*      (2018.01)
*G08B 25/00*      (2006.01)
(52) U.S. Cl.
CPC .......... *H04W 76/50* (2018.02); *G08B 25/006* (2013.01)
(58) Field of Classification Search
CPC .............................. H04W 76/50; G08B 25/006

USPC ....................................................... 455/404.1
See application file for complete search history.

(56) References Cited

U.S. PATENT DOCUMENTS

| | | | |
|---|---|---|---|
| 8,116,723 B2 * | 2/2012 | Kaltsukis | H04L 65/1069 |
| | | | 455/403 |
| 2005/0200479 A1 | 9/2005 | James | |
| 2010/0035543 A1 | 2/2010 | Nishida | |
| 2016/0191862 A1 * | 6/2016 | Yokomitsu | H04N 5/907 |
| | | | 348/158 |
| 2017/0372011 A1 * | 12/2017 | Noeth | G16H 40/67 |
| 2019/0318740 A1 | 10/2019 | Takiguchi et al. | |
| 2021/0409916 A1 * | 12/2021 | Briemle | G08B 25/016 |

FOREIGN PATENT DOCUMENTS

| | | |
|---|---|---|
| DE | 10 2017 216 359 A1 | 3/2019 |
| EP | 3 758 321 A1 | 12/2020 |
| WO | WO 2019/064650 A1 | 4/2019 |

* cited by examiner

*Primary Examiner* — Michael R Neff
(74) *Attorney, Agent, or Firm* — STAAS & HALSEY LLP

(57) ABSTRACT

A method for issuing an emergency call, in which a backend server receives emergency call data from a vehicle via a wireless connection provided by a communication unit of the vehicle and sends an emergency call for the vehicle to a control center based on the received emergency call data.

10 Claims, 1 Drawing Sheet

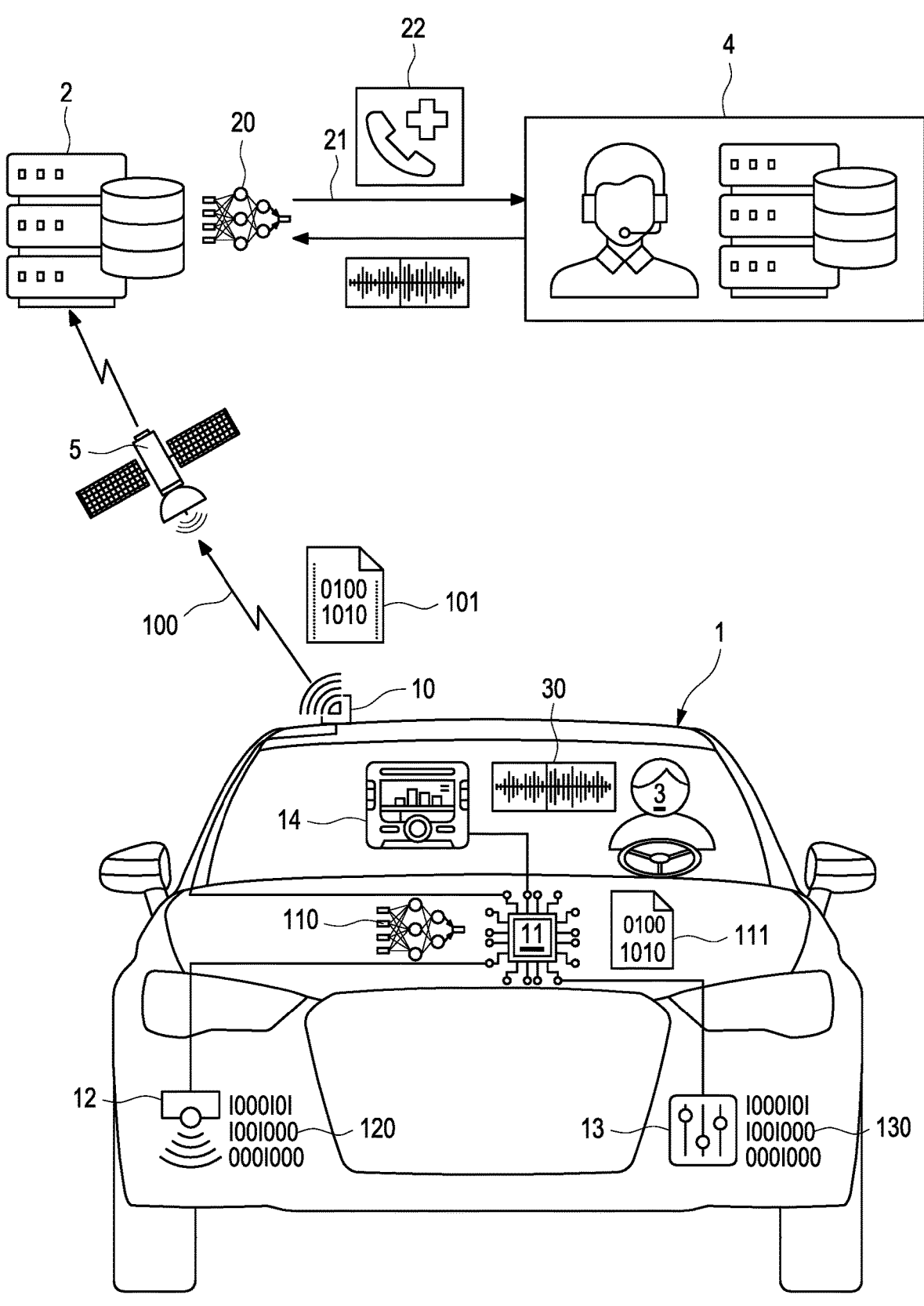

EMERGENCY CALL METHOD WITH LOW CONSUMPTION OF SPECTRAL RESOURCES

CROSS-REFERENCE TO RELATED APPLICATIONS

This application claims the foreign priority benefit of German Application No. DE 10 2022 119 837.5 filed on Aug. 8, 2022, which German Application is incorporated by reference herein in entirety.

BACKGROUND

1. Field

The described examples of an invention relate to a method for issuing an emergency call, in which a backend server receives emergency call data from a vehicle via a wireless connection provided by a communication unit of the vehicle and sends an emergency call for the vehicle to a control center based on the received emergency call data.

2. Description of the Related Art

Methods of the type mentioned above are found in the prior art in various embodiments and serve to increase the efficiency of an emergency call made by a vehicle, for example a passenger car (car). The backend server usually belongs to a private control center (third-party service provider, TPSP) that can be provided by a vehicle manufacturer. The control center is usually a public security access point (PSAP).

The emergency call made by the vehicle typically includes a telephone conversation between a vehicle occupant and a contact person at the private control center, and a data packet (Minimal Set of Data, MSD) that is transmitted to the private control center prior to the call or during the call. To reduce the load on the control center personnel, an artificial intelligence system in the backend server can implement the contact person of the private control center.

For example, DE 10 2017 216 359 A1 discloses a method for interpreting a speech input, in which an artificial neural network typically interprets the speech input and a human being supports the artificial neural network only if an interpretation of the speech input by the artificial neural network fails.

US 2019/0318740 A1 discloses virtual humans created by artificial neural networks, which communicate with real persons and with each other using a natural language.

Every phone call requires a wireless voice connection, which is usually provided by a mobile radio network as a full-duplex connection. The data packet can be transmitted by the voice connection. Alternatively, the data packet can be transmitted by a wireless data connection separate from the full-duplex connection, for which a simplex connection is sufficient.

EP 3 758 312 A1, for example, discloses a method for issuing an emergency call, in which a vehicle issues an emergency call to a control center in the usual way after previously sending a dataset comprising emergency call data to a traffic server by a data connection. In this way, additional vehicles can be informed by the traffic server independently of the emergency call and without delay using the emergency call data.

The full-duplex connection allows for a simultaneous bidirectional data stream capable of supporting a conversation, and the simplex connection allows for only a unidirectional data stream capable of supporting a conversation. Accordingly, the full-duplex connection consumes more spectral resources than the simplex connection.

However, the spectral resources deployed at the vehicle location may be insufficient for the known emergency call. In particular, a mobile radio network may not be available at the vehicle location, i.e. no spectral resources are provided for a mobile voice connection.

SUMMARY

In an example, a method for issuing an emergency call, which has a low requirement for spectral resources, may be provided.

In an example, a method for issuing an emergency call, an emergency call method for short, may be provided in which a backend server receives emergency call data from a vehicle via a wireless connection provided by a communication unit of the vehicle and issues an emergency call for the vehicle to a control center based on the received emergency call data. The emergency call method can be carried out by a private control center (TPSP) and can involve a statutory control center (PSAP).

According to an example, a communication unit of the vehicle may provide the wireless connection as a simplex connection and the communication unit may transmit the emergency call data via the simplex connection. The simplex connection has a low spectral resource requirement, which may also only be required to support a one-way connection. In an example, the method may use only the simplex connection as the wireless connection of the vehicle to the backend server and that the simplex connection is provided as a pure data connection for transmitting the emergency call data. In this way, the method also works in situations where the availability of spectral resources is low, in particular when bidirectional links are not supported.

The emergency call data may include the same information that is transmitted by a voice connection. Thus, the efficiency of the emergency call may be equivalent to that of a voice connection.

In an example, the communication unit may provide the wireless connection as a connection to a satellite. The satellite can be non-stationary. Non-stationary satellites, such as Starlink satellites or Kuiper satellites, may provide spectral resources for simplex connections on a virtually worldwide basis. On account of the satellite, the emergency call method can be implemented essentially without any territorial restrictions.

An infotainment system of the vehicle can receive occupant data entered by a vehicle occupant and send the received occupant data to a control unit of the vehicle, and the control unit can receive the transmitted occupant data and provide the received occupant data as the emergency call data. In other words, the occupant data associated with the emergency call may be collected by the infotainment system and made available to the control unit as emergency call data.

Advantageously, the reception of the occupant data may include querying the occupant data by a dialog conducted with the occupant by the infotainment system, and an artificial neural network of the control unit may determine the dialog of the infotainment system depending on a generated data packet. In short, the occupant conducts a conversation with the artificial neural network arranged in the vehicle, i.e. the occupant communicates with the artificial neural network in a known manner by sound. The artificial neural network may use the infotainment system, in particular a microphone of the infotainment system and a loudspeaker of the infotainment system, for generating and capturing sound.

The control unit may generate the data packet, and the artificial neural network may generate questions matching the data packet, which are posed to the occupant by the infotainment system in natural language, i.e. in audibly perceptible form. The occupant answers the questions posed in natural language. The infotainment system captures the passenger's responses and provides the captured responses to the control unit. The control unit extracts the occupant data from the responses provided.

Both parties, namely the occupant and the artificial neural network, may be arranged in the vehicle, i.e. the call does not leave the vehicle, so that a full-duplex connection of the vehicle to the backend server may be avoided. The entered occupant data may include an extract of the conversation conducted between the occupant and the artificial neural network.

In an example, sensors of the vehicle and/or other control units of the vehicle provide collision data of the vehicle and/or operating data of the vehicle and the control unit may generate the data packet depending on the provided collision data and/or operating data. The data packet may contain vehicle data that the control unit receives from the sensors and other control units as the collision data or as the operating data. The vehicle data may allow the control unit to classify an accident event and allows the artificial neural network to formulate questions appropriate to the classified accident event.

The data packet can include a standardized minimum set of data (MSD).

The dialog can be conducted in multiple parts. In other words, multiple dialogs can be conducted sequentially if the entered occupant data is insufficient for the backend emergency call. Each subsequent dialog may be used to supplement missing occupant data, to clarify inaccurate occupant data, or to correct implausible occupant data.

The communication unit can send the entered occupant data and the generated data packet over the wireless connection provided, and the backend server can receive the transmitted data packet and the transmitted occupant data. The simplex connection supports the transmission of the generated data packet and the entered occupant data from the vehicle to the backend server.

In an example, the backend server may provide a connection to the control center and the backend issues an emergency call to the control center via the provided connection, and issuing the emergency call may include answering questions from the control center. The connection of the backend server to the control center is provided as a full duplex connection, for example as a known analog voice connection or as a known Voice-over-IP (VoIP) connection. The backend server may answer the questions of the control center instead of the occupant.

In an example, an artificial neural network of the backend server may answer the questions of the control center depending on the transmitted emergency call data. A contact person at the control center conducts a conversation with the artificial neural network of the backend server. The artificial neural network of the backend server may use the emergency call data sent by the communication unit of the vehicle in order to formulate audibly perceptible answers to the questions from the control center in natural language.

The artificial neural network of the control unit may be advantageously updated if the artificial neural network of the backend server has not answered a question from the control center. The artificial neural network of the backend server may leave questions from the control center unanswered if the entered occupant data is insufficient for answering the questions. In this case, the update will enable the artificial neural network of the control unit to ask the occupant further and/or better questions. A manufacturer of the control unit can update the artificial neural network by remote access at any time if necessary.

An essential advantage of the method according to the described examples of the invention may be that the method may have a low spectral resource consumption. As a result, the method allows a vehicle to use a wireless connection to a satellite, making it possible to issue an emergency call essentially worldwide.

BRIEF DESCRIPTION OF DRAWINGS

These and other aspects and advantages of examples of the invention will become more apparent and more readily appreciated from the following description of the examples, taken in conjunction with the accompanying drawings of which:

FIG. 1 shows a block diagram of a method according to an example for issuing an emergency call.

DESCRIPTION

Referring to FIG. 1, a backend server 2 receives emergency call data 101 from a vehicle 1 via a wireless connection 100 provided by a communication unit 10 of the vehicle 1. The backend server 2 issues an emergency call 22 to a control center 4 on the basis of the received emergency call data 101 for the vehicle 1.

An infotainment system 14 of the vehicle 1 can receive occupant data 30 entered by an occupant 3 of the vehicle 1 and transmit the received occupant data 30 to a control unit 11 of the vehicle 1. The control unit 11 can receive the transmitted occupant data 30 and provide the received occupant data 30 as the emergency call data 101.

The reception of the occupant data 30 advantageously may include querying the occupant data 30 by a dialog conducted with the occupant 3 by the infotainment system 14. Further advantageously, an artificial neural network 110 of the control unit 11 may determine the dialog of the infotainment system 14 depending on a generated data packet 111. The dialog can be conducted in multiple parts.

Sensors 12 of the vehicle 1 and/or further control units 13 of the vehicle 1 can provide collision data 120 of the vehicle 1 and/or operating data 130 of the vehicle 1 and the control unit 11 can generate the data packet 111 depending on the provided collision data 120 and/or operating data 130.

The communication unit 10 of the vehicle 1 may provide the wireless connection 100 as a simplex connection and transmit the emergency call data 101 via the simplex connection. In an example, the communication unit 10 may provide the wireless connection 100 as a connection to a satellite 5.

The communication unit 10 can send the entered occupant data 30 and the generated data packet 111 via the provided wireless connection 100 as the emergency call data 101. The backend server 2 can receive the transmitted data packet 111 and the transmitted occupant data 30.

The backend server 2 may provide a connection 21 to the control center 4 and issue the emergency call 22 to the control center 4 via the provided connection 21. Issuing the emergency call 22 may include, for example, answering questions from the control center 4.

In particular, an artificial neural network 20 of the backend server 2 can answer the questions from the control center 4 depending on the transmitted emergency call data 101.

The artificial neural network 110 of the control unit 11 may be updated if the artificial neural network 20 of the backend server 2 has not answered a question from the control center 4. The back end server 2, the units of the communication unit 10, the control unit 11 with the neural network 110, and the additional control units 13, may be implemented based on at least one computer processor.

LIST OF REFERENCE SIGNS

1 vehicle
10 communication unit
100 wireless connection
101 emergency call data
11 control unit
110 artificial neural network
111 data packet
12 sensor
120 collision data
13 additional control unit
130 operating data
14 infotainment system
2 backend server
20 artificial neural network
21 connection
22 emergency call
3 occupant
30 occupant data
4 control center
5 satellite

The invention claimed is:

1. A method of issuing an emergency call for a vehicle that includes at least one computer processor, the method comprising:
   by a backend server,
      receiving emergency call data from the vehicle via a wireless connection with the vehicle provided by a computer processor among the at least one computer processor that implements a communication unit of the vehicle, and
      issuing an emergency call to a control center on basis of the emergency call data for the vehicle,
   by the communication unit of the vehicle,
      providing the wireless connection between the vehicle and the backend server as a simplex connection, and
      transmitting the emergency call data from the vehicle to the backend server via the simplex connection.

2. The method according to claim 1, wherein the communication unit provides the wireless connection as a connection to a satellite.

3. The method according to claim 1, further comprising:
   receiving, by an infotainment system of the vehicle, occupant data entered by an occupant of the vehicle and transmitting the occupant data to a computer processor among the at least one computer processor that implements a control unit of the vehicle; and
   providing, by the control unit the occupant data as the emergency call data.

4. The method according to claim 3, wherein,
   the receiving, by the infotainment system, of the occupant data comprises querying the occupant data by a dialog conducted with the occupant by the infotainment system, and
   an artificial neural network of the control unit determines the dialog of the infotainment system depending on a data packet generated by the vehicle.

5. The method according to claim 4, wherein sensors of the vehicle and/or other computer processors among the at least one computer processor that implement other control units of the vehicle provide collision data of the vehicle and/or operating data of the vehicle, such that the control unit of the vehicle generates the data packet depending on the collision data and/or the operating data.

6. The method according to claim 4, wherein the dialog is conducted in multiple parts.

7. The method according to claim 4, wherein the communication unit transmits the occupant data and the generated data packet via the provided wireless connection as the emergency call data and the backend server receives the data packet and the occupant data transmitted by the communication unit.

8. The method according to claim 4, wherein,
   the backend server provides a connection to the control center and issues the emergency call to the control center via the provided connection, and
   the issuing of the emergency call comprises answering questions from the control center.

9. The method according to claim 8, wherein an artificial neural network of the backend server answers the questions from the control center depending on the emergency call data.

10. The method according to claim 9, in which the artificial neural network of the control unit of the vehicle is updated if the artificial neural network of the backend server has not answered a question from the control center.

* * * * *